United States Patent
Fischer et al.

(10) Patent No.: US 11,358,558 B2
(45) Date of Patent: Jun. 14, 2022

(54) LEG RESTRAINING AIRBAG

(71) Applicant: ZF Passive Safety Systems US Inc., Washington, MI (US)

(72) Inventors: Kurt F. Fischer, Rochester, MI (US); Douglas Gould, Lake Orion, MI (US); Hylus Ranjit Raj Jayakar, Shelby Township, MI (US); Diaz Gabriela, Royal Oak, MI (US); David Varcoe, Bruce Township, MI (US)

(73) Assignee: ZF PASSIVE SAFETY SYSTEMS US INC., Washington, MI (US)

( * ) Notice: Subject to any disclaimer, the term of this patent is extended or adjusted under 35 U.S.C. 154(b) by 0 days.

(21) Appl. No.: 16/921,991

(22) Filed: Jul. 7, 2020

(65) Prior Publication Data

US 2022/0009443 A1 Jan. 13, 2022

(51) Int. Cl.
| | |
|---|---|
| *B60R 21/231* | (2011.01) |
| *B60R 21/2338* | (2011.01) |
| *B60R 21/013* | (2006.01) |
| *B60R 21/00* | (2006.01) |
| *B60R 21/26* | (2011.01) |

(52) U.S. Cl.
CPC ...... *B60R 21/23184* (2013.01); *B60R 21/013* (2013.01); *B60R 21/2338* (2013.01); *B60R 21/26* (2013.01); *B60R 2021/0046* (2013.01); *B60R 2021/0053* (2013.01); *B60R 2021/23176* (2013.01)

(58) Field of Classification Search
CPC .......... B60R 21/23184; B60R 21/2338; B60R 21/013; B60R 2021/23176; B60R 2021/0053; B60R 21/26; B60R 2021/0046; B60R 21/231; B60R 2021/0051

See application file for complete search history.

(56) References Cited

U.S. PATENT DOCUMENTS

| | | | | |
|---|---|---|---|---|
| 5,464,246 | A * | 11/1995 | Castro | B60R 21/08 244/122 AG |
| 6,017,059 | A * | 1/2000 | Taubenberger | B60R 21/23184 280/730.1 |
| 6,142,521 | A * | 11/2000 | Shephard | B60R 19/00 280/728.1 |
| 6,336,653 | B1 * | 1/2002 | Yaniv | B60R 21/2338 280/730.1 |

(Continued)

FOREIGN PATENT DOCUMENTS

WO  WO-2020231511 A1 * 11/2020 ........... B60R 21/232

*Primary Examiner* — Paul N Dickson
*Assistant Examiner* — Kurtis Nielson
(74) *Attorney, Agent, or Firm* — Tarolli, Sundheim, Covell & Tummino LLP

(57) ABSTRACT

An apparatus, system, and method for helping to protect occupants of a vehicle in the event of a collision. The apparatus comprising an inflatable tube having a first and second end connected to the floor of the vehicle and a middle portion therebetween and an inflator that is actuatable to direct inflation fluid into the inflatable tube in response to a vehicle collision. The inflatable tube is configured to inflate and deploy from the vehicle floor in response to receiving inflation fluid from the inflator. The middle portion extends from the floor and forms an arch into which the lower legs and/or feet of the occupant can move into in response to a collision and be restrained.

16 Claims, 7 Drawing Sheets

(56) References Cited

U.S. PATENT DOCUMENTS

| | | | | |
|---|---|---|---|---|
| 8,733,844 | B1* | 5/2014 | Widmer | B60N 2/24 |
| | | | | 297/452.41 |
| 10,023,145 | B1* | 7/2018 | Rivera | B60R 21/0136 |
| 10,525,922 | B1* | 1/2020 | Lin | B60R 21/01516 |
| 11,059,448 | B2* | 7/2021 | Rutelin | B60R 21/015 |
| 2012/0292894 | A1* | 11/2012 | Kobayashi | B60R 21/20 |
| | | | | 280/730.1 |
| 2018/0170217 | A1* | 6/2018 | Galbreath | B60N 2/686 |
| 2018/0361981 | A1* | 12/2018 | Faruque | B60R 21/231 |
| 2020/0062210 | A1* | 2/2020 | Fu | B60R 21/231 |
| 2021/0078517 | A1* | 3/2021 | Fischer | B60R 21/2338 |
| 2021/0107426 | A1* | 4/2021 | Choi | B60N 3/002 |

* cited by examiner

--Prior Art--

LEG RESTRAINING AIRBAG

TECHNICAL FIELD

The present disclosure relates generally to helping to protect occupants of autonomous vehicles in the event of a collision and, more specifically, an apparatus, system, and method for protecting the lower legs and/or feet of an occupant.

BACKGROUND

It is known to provide an inflatable vehicle occupant protection device, such as an airbag, for helping to protect an occupant of a vehicle. One particular type of airbag is a frontal airbag inflatable between an occupant of a front seat of the vehicle and an instrument panel of the vehicle. Such airbags may be driver airbags or passenger airbags. When inflated, the driver and passenger airbags help protect the occupant from impacts with parts of the vehicle such as the instrument panel and/or a steering wheel of the vehicle.

Passenger airbags are typically stored in a deflated condition in a housing that is mounted to the vehicle instrument panel. An airbag door is connectable with the housing and/or instrument panel to help enclose and conceal the airbag in a stored condition. Upon deployment of the passenger airbag, the airbag door opens to permit the airbag to move to an inflated condition. The airbag door opens as a result of forces exerted on the door by the inflating airbag.

Driver airbags are typically stored in a deflated condition in a housing that is mounted on the vehicle steering wheel. An airbag cover is connectable with the housing and/or steering wheel to help enclose and conceal the airbag in a stored condition. Upon deployment of the driver airbag, the airbag cover opens to permit the airbag to move to an inflated condition. The airbag cover opens as a result of forces exerted on the cover by the inflating driver airbag.

There are trends in the auto industry to make vehicles more spacious. Styling has been making the instrument panel smaller and thus farther away from the occupant. Looking further into the future, driverless, autonomous vehicles are even more spacious. Autonomous vehicles have been contemplated for some time, and now their adaption on a large scale is approaching. Autonomous vehicles can eliminate some of the structure traditionally relied upon for supporting various vehicle safety devices.

With these realities as a backdrop, the paradigm of occupant safety systems must shift. In the past, the necessity of a vehicle operator/driver lent to a somewhat standard vehicle passenger cabin configuration. In the U.S., the driver is a front seat, left side, forward facing occupant within reach of the vehicle controls and instrumentation (steering wheel, pedals, instrument panel, console, etc.). This driver configuration helps dictate the layout of the remainder of the vehicle—front seat, forward-facing passenger-side occupant, rear seat (second row, third row, etc.) forward-facing occupants. Accordingly, in the past, occupant safety systems were typically designed with this passenger cabin layout and the associated occupant positions and orientations in mind.

The autonomous vehicle eliminates the operator/driver, which eliminates the necessity of their being positioned and oriented in the conventional manner. Vehicle manufacturers are free utilize passenger cabin space as they see fit without being constrained to predetermined passenger arrangements, such as all forward-facing occupants, or vehicle structural configurations, such as steering wheel/instrument panel configurations, center console configurations, foot well pedal controls, etc.

This presents the challenge of not only where to locate airbag systems, but also finding a reaction surface against which to position the airbag so that it can absorb impacts. Typically, instrument panel and steering wheel mounted frontal airbags utilize those structures as a reaction surface against which the airbag rests so that it can oppose, cushion, and absorb the impact energy of an impacting occupant and provide a desired ride-down effect. In the autonomous vehicles, however, the vehicle may not have an instrument panel or steering wheel at all, and the occupants can be positioned and oriented outside the traditional manner. This can make it difficult or impossible to utilize traditional structures in the vehicle as reaction surface.

SUMMARY

The present disclosure relates generally to helping to protect occupants of autonomous vehicles in the event of a collision and, more specifically, an apparatus, system, and method for protecting the lower legs and/or feet of an occupant.

In one aspect the present disclosure can include an apparatus for helping to protect occupants of a vehicle in the event of a collision. The apparatus comprising an inflatable tube having first and second ends connected to a floor of the vehicle, the inflatable tube further comprising a middle portion that extends from the first to the second end and an inflator that is actuatable to direct inflation fluid into the inflatable tube in response to a vehicle collision. The inflatable tube is configured to inflate and deploy from the vehicle floor in response to receiving inflation fluid from the inflator. The middle portion of the inflatable tube is configured to extend above the vehicle floor to define a space for receiving the lower legs and/or feet of the occupant and restrain forward movement of the lower legs and/or feet in response to the vehicle collision.

In another aspect the present disclosure can include a method for helping to protect occupants of a vehicle in the event of a collision. The method comprising the steps of sensing the occurrence of a vehicle collision event and deploying the apparatus in response to the sensed vehicle collision.

In another aspect the present disclosure can include a system for helping to protect occupants of a vehicle in the event of a collision. The system comprises the apparatus, at least one crash sensor for detecting a vehicle collision event, and a controller for receiving a signal from the at least one crash sensor in response to the vehicle collision event. The controller is configured to actuate the inflator to deploy the inflatable tube in response to receiving the signal from the crash sensor.

BRIEF DESCRIPTION OF THE DRAWINGS

The foregoing and other features of the present disclosure will become apparent to those skilled in the art to which the present disclosure relates upon reading the following description with reference to the accompanying drawings, in which.

DETAILED DESCRIPTION

The present disclosure relates generally to helping to protect occupants of a vehicle in the event of a collision. One scenario where challenges to occupant protection can arise is that of autonomous vehicles, specifically the lower legs of the occupant. Accordingly, the invention disclosed herein relates to an apparatus, system, and method for protecting the lower legs and/or feet of an occupant in any vehicle, especially an autonomous vehicle.

Figure 1:
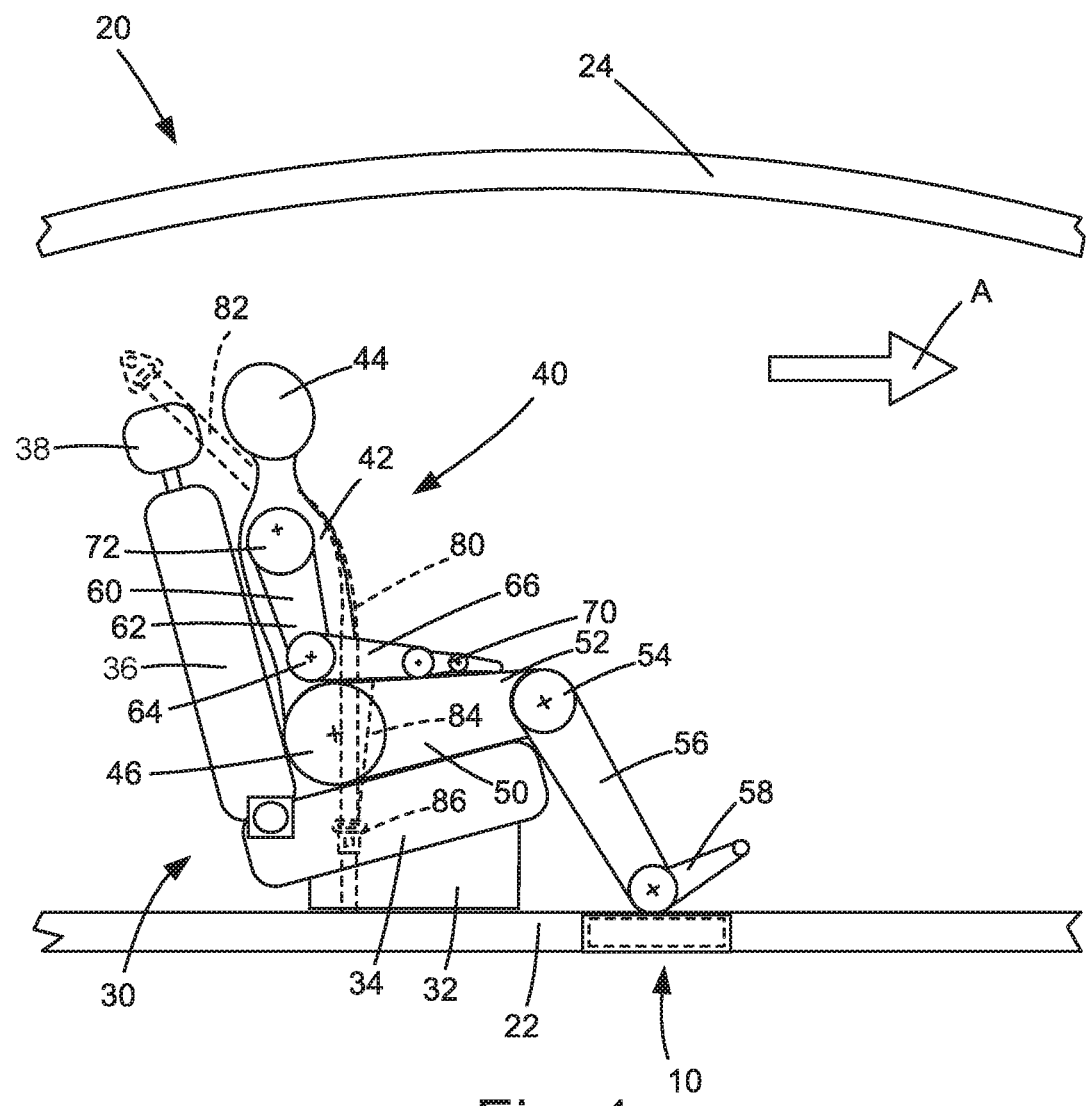
FIG. 1 is a schematic illustration of a vehicle including a vehicle safety system depicting the system in a pre-deployment condition.

Referring to FIG. 1, a vehicle 20 includes a vehicle seat 30 upon which a vehicle occupant 40 is seated. The vehicle seat 30 includes a base 32 connected to the vehicle 20, e.g., to the floor 22. The seat base 32 supports a seat bottom 34. A seatback 36 extends upward from the seat bottom 34 and has a reclined position that can be adjusted. A headrest 38 is positioned at an upper end of the seatback 36.

The occupant 40 is seated on the seat 30, with his/her torso 42 resting on the seatback 36, head 44 positioned at or near the headrest 38, and buttocks 46 and legs 50 (more specifically upper legs 52) resting on the seat bottom 34. The occupant's lower legs 56 extend from the knee 54 downward toward the vehicle floor 22, where the occupant's feet 58 rest. In the typical occupant position of FIG. 1, the occupant's arms 60 are at his/her side, with the upper arms 62 adjacent and parallel to the torso 42, bent at the elbows 64 with the lower arms/forearms 66 and hands 70 resting on the upper legs 52.

Figure 3:
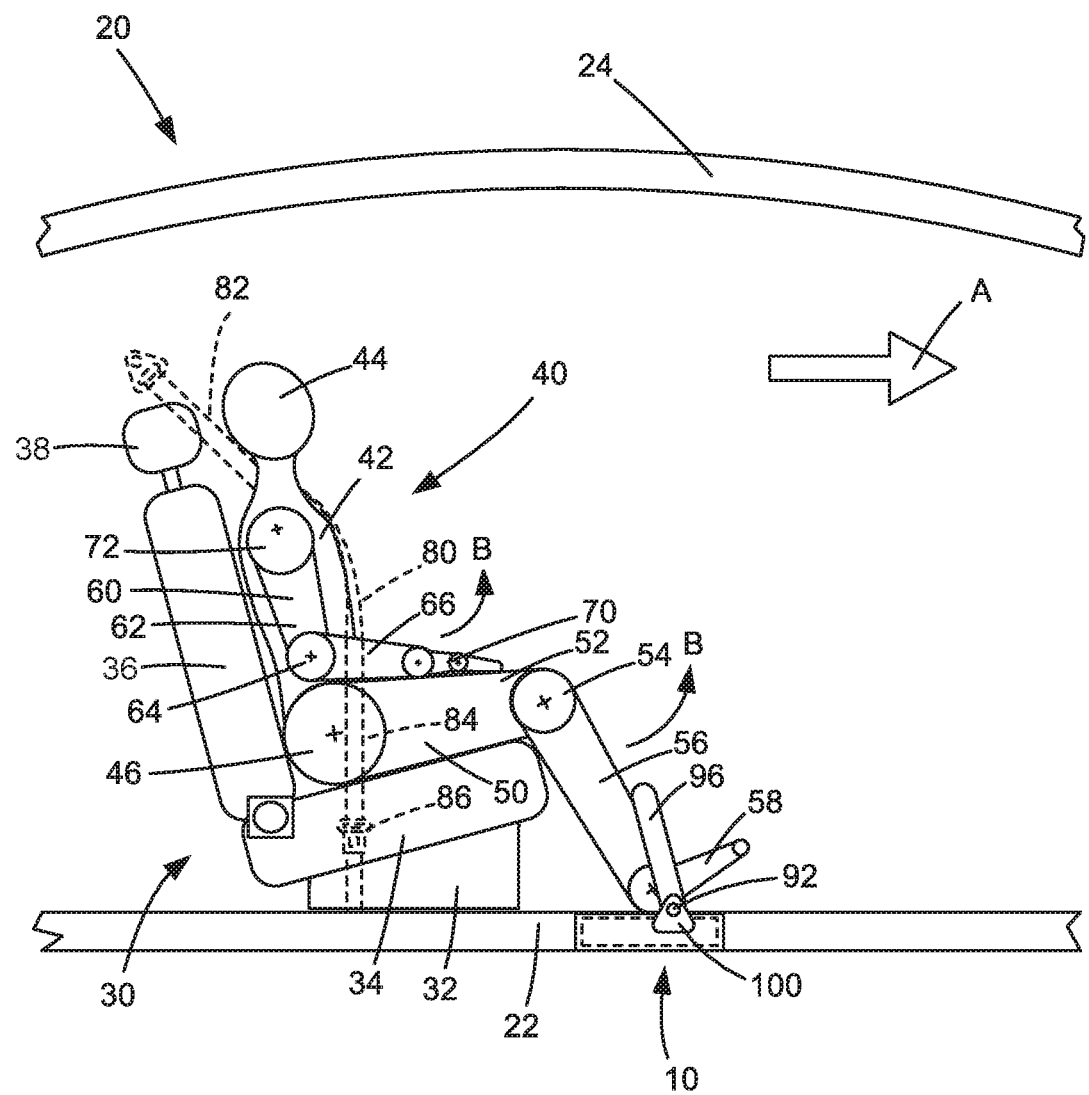
FIG. 3 is a schematic illustration of a vehicle including a vehicle safety system depicting the system in a deployed condition.
Figure 4:
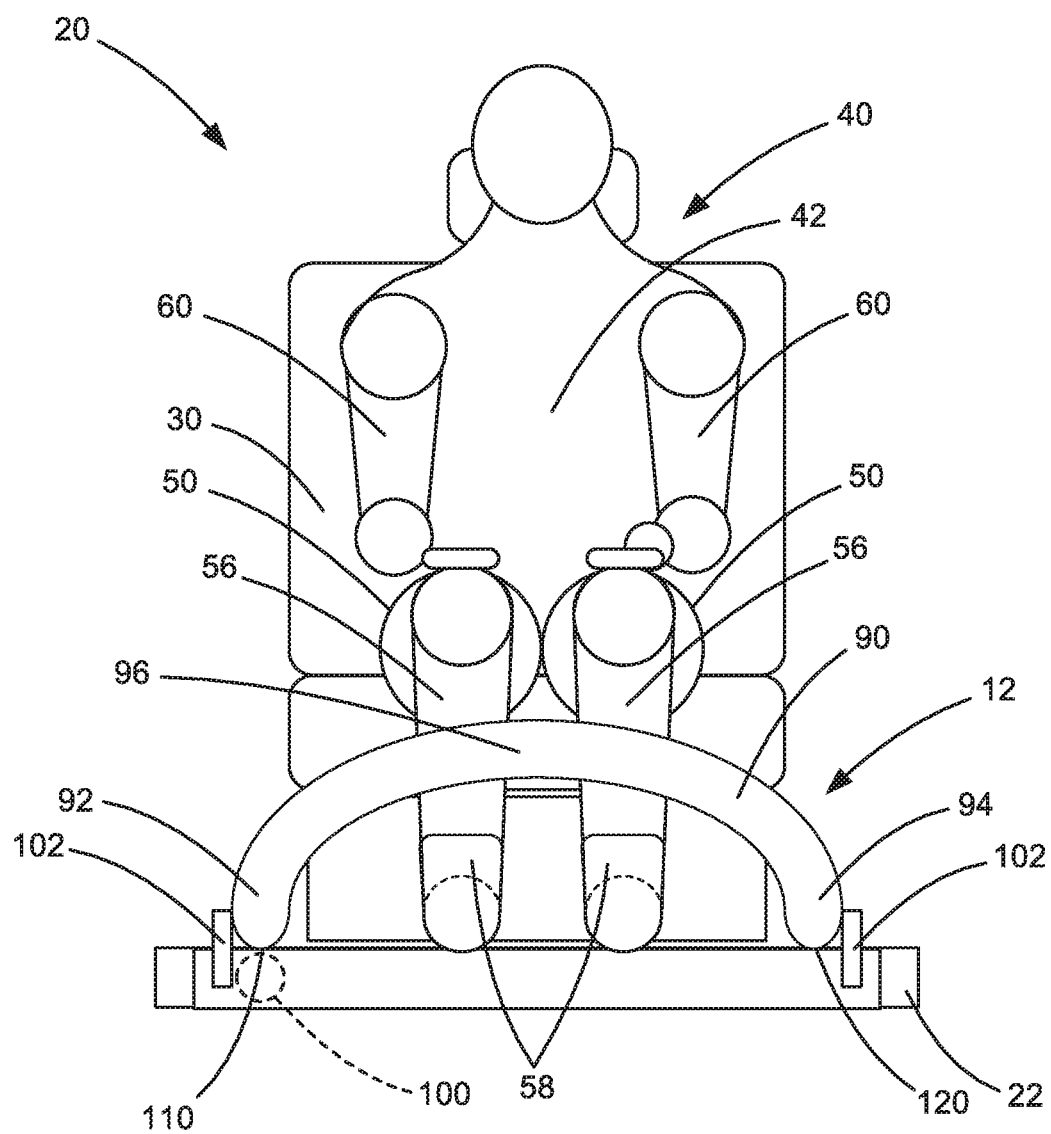
FIG. 4 is a schematic illustration of the vehicle depicting the vehicle safety system in a deployed condition, according to a configuration of the system.

As shown in FIG. 1, the occupant 40 is restrained by a seatbelt 80, which is a conventional three-point restraint including a shoulder belt portion 82 that extends from a shoulder 72 diagonally across the torso 42, and a lap belt portion 84 that extends across the occupant's lap, i.e., where the upper legs 52 meet the torso 42. The seatbelt 80 is secured via a buckle 86, which is anchored to the vehicle 20. To simplify the drawings, the seatbelt 80 is not illustrated in FIGS. 3 and 4. In FIGS. 3 and 4, the occupant 40 is wearing a seatbelt, it just isn't shown in the figures. The occupant movements illustrated and described with reference to FIGS. 3 and 4 are therefore those that would take place with normal use of the seatbelt 80 illustrated in FIG. 1.

Referring to FIGS. 1 and 3, a vehicle safety system 10 helps protect the occupant 40 of the vehicle 20. In the example configuration of FIGS. 1 and 3, the vehicle 20 is an autonomous vehicle. As such, the passenger compartment or cabin is without operator controls, such as a steering wheel, pedals, instrumentation, center console, etc. Accordingly, the instrument panel is reduced in size and/or removed altogether in order to maximize the space in the cabin. Control interfaces for climate controls, GPS, navigation, entertainment, etc. can, for example, be provided in a center console area of the vehicle 20 located between the passengers of the front and/or rear rows. Alternatively, the vehicle 20 can also be any other type of vehicle where the passenger compartment or cabin is without operator controls, such as a limousine.

In this open passenger cabin configuration, vehicle seats 30 can be configured, positioned, and arranged in a variety of manners, not constrained by the need to facilitate a vehicle driver/operator. For example, in FIG. 1, the seat 30 is a forward-facing seat, facing in the direction of forward vehicle travel indicated generally by the arrow labeled A. In another configuration, not shown, the seats can be arranged facing each other, with the front row FR facing rearward toward the rear row RR.

Figure 2:
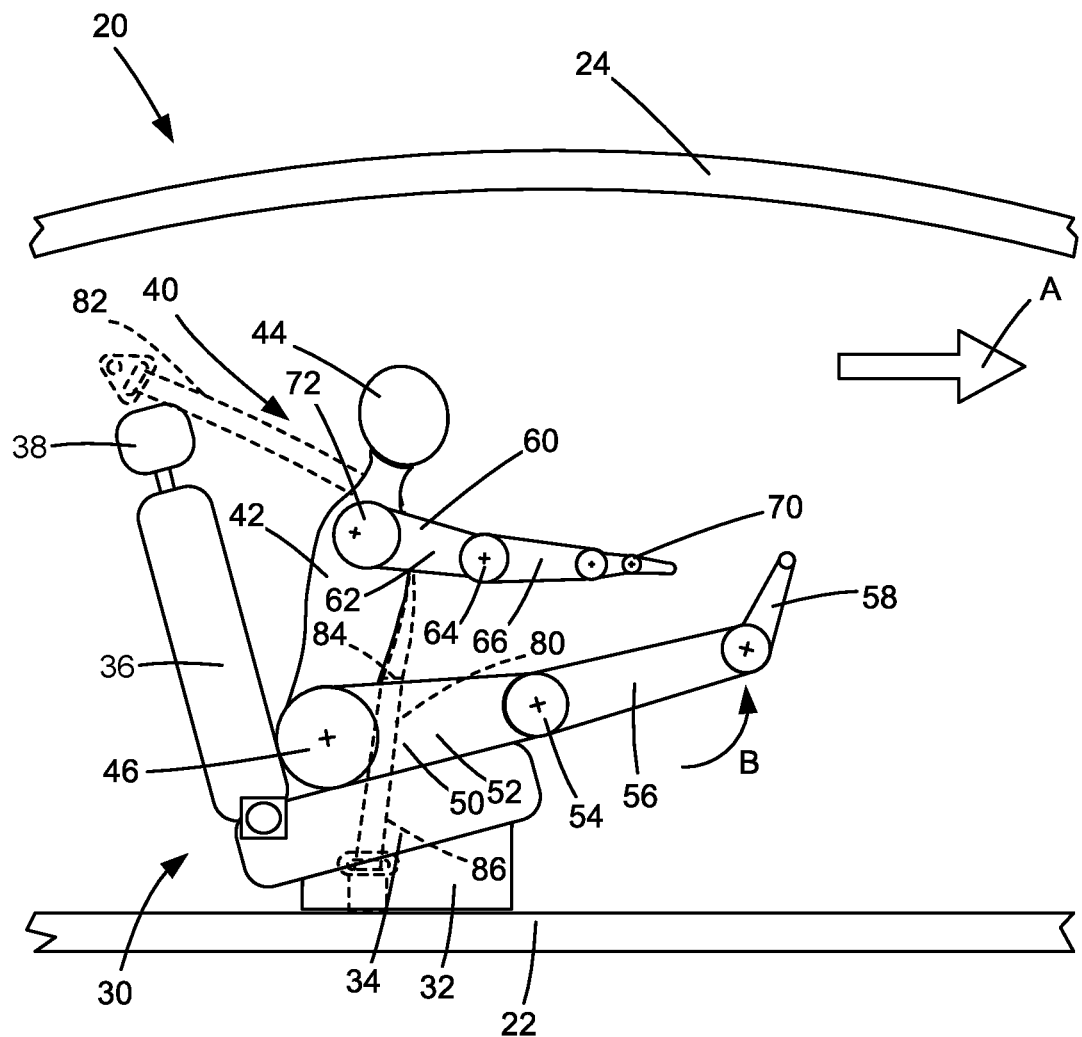
FIG. 2 is a schematic illustration of a vehicle with no vehicle safety system depicting a collision event.

For the conventional, forward-facing seating arrangement of FIG. 1, in the event of a frontal crash, the occupants 40 is urged forward in the vehicle, as shown in FIG. 2. As shown in FIG. 2, the seatbelt restrains the occupant 40, particularly the torso 42, without restraining the arms 60 and legs 50. As a result, it can be seen that the legs 50 become extended due to inertia, as indicated generally by the arrow labeled B. This can stress the legs 50, such as hyperextension of the knees 54. Non-autonomous vehicles had structure for blocking this motion, such as the instrument panel/footwell (front passengers) and seatbacks of forward seating (rear passengers). Autonomous vehicles may not include these features.

Referring to FIGS. 1 and 3, in an example configuration, the vehicle safety system 10 includes a lower leg protection apparatus 12 to help protect occupants of an autonomous vehicle in the event of a collision. In this example configuration, the apparatus 12 is inflatable vehicle occupant protection device in the form of an inflatable tube 90 mounted in a floor 22 of the vehicle 20. The protection device 12 also includes an inflator 100 configured to inflate the inflatable tube 90 in response to a vehicle collision.

As shown in further detail in FIG. 4, the inflatable tube has opposite first and second ends 92, 94 connected to the floor 22. A middle portion 96 extends from the first end 92 to the second end 94. When the inflatable tube 90 is inflated and deployed, the middle portion 96 is configured to extend above the vehicle floor 22 and define a space for receiving the lower legs 56 and/or feet 58 of the occupant 40. In the example configuration of FIG. 4, the tube 90 forms an arch for receiving the occupant's lower legs 56/feet 58. The tube 90 can, however, be any shape capable of defining a space for receiving and restraining the lower legs 56 and/or feet 58 of the occupant in response to a collision. The tube 90 can, for example, have a rounded, squared, rectangular, or polygonal shape.

The first and second ends 92, 94 of the inflatable tube 90 are connected to the vehicle floor 22 at locations forward of a vehicle seat 30 and at or near the laterally outer bounds of the vehicle seat 30. The locations 110 and 120 where the first end 92 and the second end 94 of the inflatable tube 90 are connected to the vehicle floor 22 are configured to be on the outer sides of the occupants feet when the occupant 40 is in the normal seated position, as described above. For instance, the first and second ends 92, 94 of the inflatable tube 90 can be spaced about 0.5 meters apart.

The first and second ends 92, 94 of the inflatable tube 90 are connected to the vehicle floor 22 by connectors 102 configured to withstand forces resulting from restraining the occupant's 40 lower legs 56 and/or feet 58 in the event of a vehicle collision. The connectors 102 can, for example, include anchor bolts, clamps, brackets, etc. In one example configuration, one end of the inflatable tube 90 can be secured to the vehicle 20 indirectly via its connection to the inflator 100 and the opposite end can be connected directly to the vehicle via a bolted connection with a clamp/bracket.

As shown in FIGS. 1 and 4, before a collision event occurs, the entire apparatus 12 is stored in or on the vehicle floor 22 in a pre-deployment state. In this pre-deployment state, the apparatus 12 is hidden within the floor 22 and does not impede the occupant's 40 ability to enter and exit the vehicle 20 or to move their legs/feet when seated. As shown in FIGS. 3 and 4, when deployed, the inflatable tube 90 is configured to encircle the occupant's 40 legs on at least three sides and to receive and restrain the lower legs 56 and/or feet 58 of the occupant 40. The inflatable tube 90 restrains the lower legs 56 and feet 58 of the occupant 40 against forward/upward movement or swinging prior to hyperextending the knees 54.

Referring to FIG. 4, in the deployed state, the inflatable tube 90 is configured to contact the front of the lower legs 56 (e.g., in the area of the tibia or ankle) or feet 58 and restrain the lower legs 56 and feet 58. The inflator 100 is configured to pressurize the inflatable tube 90 to a degree sufficient to provide some cushioning of the impact while, at the same time, restricting lower leg movement. The pressurization of the inflatable tube 90 can be configured such that the inflatable tube 90 deforms in response to the lower legs 56 impacting the tube, which can offer some deceleration of the lower legs, as opposed to an abrupt stoppage of lower leg motion. The amount of deformation in the inflatable tube 90 and, thus, the degree of deceleration offered by the tube, depends on variables such as the diameter/volume and pressure of the inflatable tube, the force with which the occupant 40 impacts the inflatable tube, and the speed at which the occupant's lower legs and/or feet 56,58 impact the inflatable tube.

From the above, it will be appreciated that there are a variety of properties of the inflatable tube 90 can be configured to provide the occupant protecting function described above. These properties can include, for example, the length of the inflatable tube 90, the diameter of the tube, the shape of the tube, and the material construction of the inflatable tube.

For example, the inflatable tube 90 can have a diameter between approximately 2 inches and 6 inches when inflated. The diameter can be the same for the entire length of the inflatable tube 90, or the diameter can vary along the length of the tube. In one example, the inflatable tube 90 can have a larger diameter in the middle portion, where the occupant's legs 56 are likely to impact the tube, than the opposite end portions. In one particular configuration, the diameter of the inflatable tube 90 increases in size gradually, from the ends toward the middle, such that the middle section or mid-point between the ends has the largest diameter. Alternatively, the middle section can have a large diameter, forming a cushion, while the end portions are smaller, sized to act as a conduit for providing inflation fluid to the cushion and/or to anchor the cushion to the floor.

The length of the inflatable tube 90, along with the diameter, can be configured to accommodate occupants 40 of varying size. This configuration can, for example, be made with reference to a statistical occupant, having physical or anthropometric characteristics as set forth by automotive safety regulative authorities, such as the National Highway Transportation Safety Administration (NHTSA) in the U.S. This affords the ability to test the performance of the inflatable tube 90 to obtain quantifiable results, using NHTSA test dummies that possess the anthropometric characteristics of the statistical occupants. This testing can therefore be used to measure whether a vehicle or safety device meets or exceeds governmental safety standards.

Vehicle safety standards, and the anthropometric characteristics of the crash test dummies used to measure compliance with these standards, can vary from country-to-country or authority-to-authority. Examples of these statistical occupants and the associated test dummies include a 50% male and a 5% female occupant. In the U.S., a 50% male represents the median U.S. male according to height and weight, meaning that half the population is taller/heavier and half is shorter/lighter. A 5% female represents a small U.S. female according to height and weight, meaning that only 5% of the female population is shorter/lighter. A NHTSA 50% adult male (Hybrid-III) crash test dummy is 5-feet, 9-inches tall and weighs 171 pounds. A NHTSA 5% adult female (Hybrid-III) crash test dummy is 4-feet, 11-inches tall and weighs 108 pounds. Other statistical occupants, such as 85% male, 95% male, and various child occupants, also exist.

Accordingly, the inflatable tube 90 can be configured to accommodate a variety of occupants. For example, the inflatable tube 90 can be configured to accommodate occupants of one or more statistical sizes. For instance, the inflatable tube 90 can be configured to accommodate both a 5% female and a 95% male. In this configuration, the inflatable tube 90 could be configured to optimize coverage for the 50% male while, at the same time, covering the 5% female and 95% male. This approach could provide the best coverage possible for the majority of the population.

Figure 5:
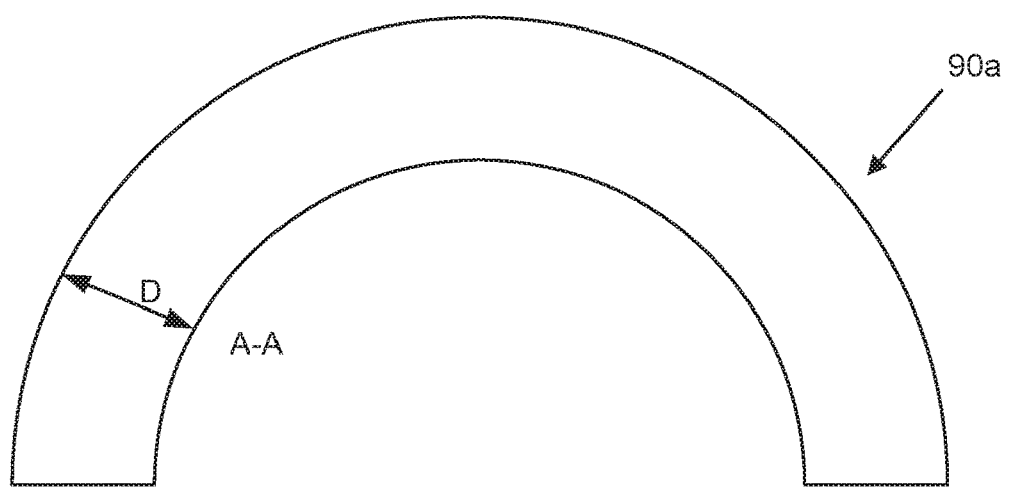
FIG. 5 is a schematic illustration of different configurations of the inflatable tube of the vehicle safety system.
Figure 5:
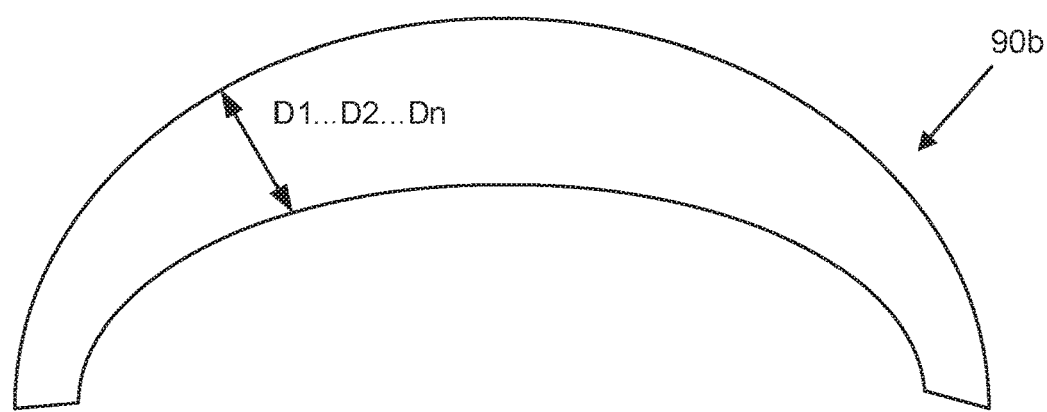
Figure 5:
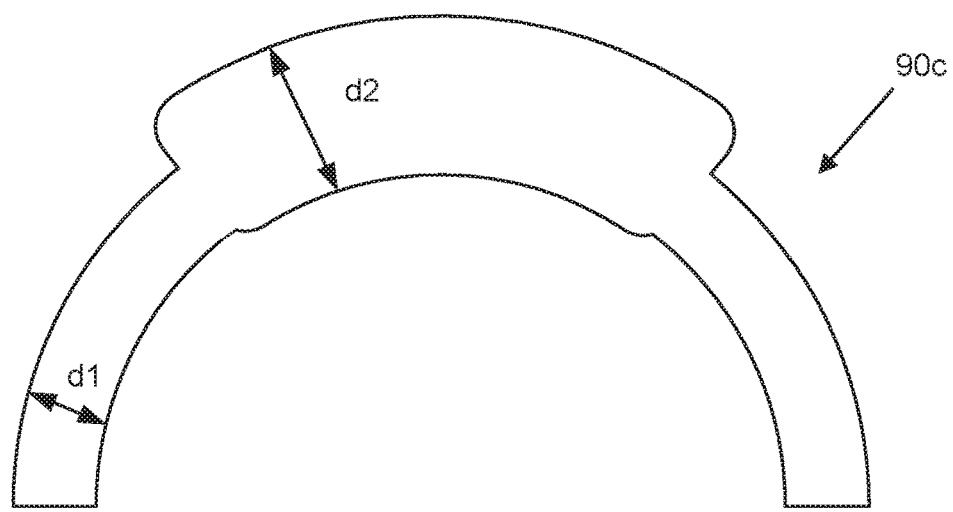

To configure the inflatable tube 90, there are several properties that can be selected or adjusted. Referring to FIG. 5, the inflatable tube 90 has a tube diameter D and a device radius R. The device radius R represents the size of the opening, defined by the inflatable tube 90, that receives the occupant's lower legs 56/feet 58. As shown in FIG. 5, this dimension is associated with an inflatable tube in the form of a circular arch. Recognizing that, as described above, the inflatable tube 90 can have alternative configurations implementing various tube shapes, the radius R is meant to illustrate that the dimensions of the tube, commensurate with its particular shape, can be adjusted to accommodate the occupant.

The tube diameter D refers to the cross-sectional diameter of the inflatable tube 90, as indicated generally by section line A-A in FIG. 5. The tube diameter can also be selected or adjusted to accommodate the occupant. The diameter of the inflatable tube 90 can be fixed or relatively consistent throughout the length of the tube, as indicated generally at D of the inflatable tube 90a in FIG. 5. Alternatively, the inflatable tube can have a tapered configuration (see tube 90b of FIG. 5), so that the diameter is larger in the middle (see $D_1$) and tapers smaller toward the opposite ends (see $D_2$). As another alternative, the tube can have large diameter mid-section (see tube 90c of FIG. 5), with smaller diameter end portions that connect the tube to the vehicle.

The inflatable tube 90 can serve multiple purposes. The primary purpose of the tube 90 is to deploy and position the apparatus 12 for receiving the occupant's lower legs 56 and feet 58. The tube 90 can also be used to cushion, at least to some extent, the impact of the occupant's legs. The cushioning effect of the tube 90 results from distorting the inflated tube and displacing the volume of inflation fluid stored therein. The ability of the inflated tube 90 to provide any cushioning effect therefore depends upon the existence of structure for supporting the inflated tube so that this distortion and displacement can occur. This structure is referred to herein as a reaction structure or a reaction surface.

Figure 6:
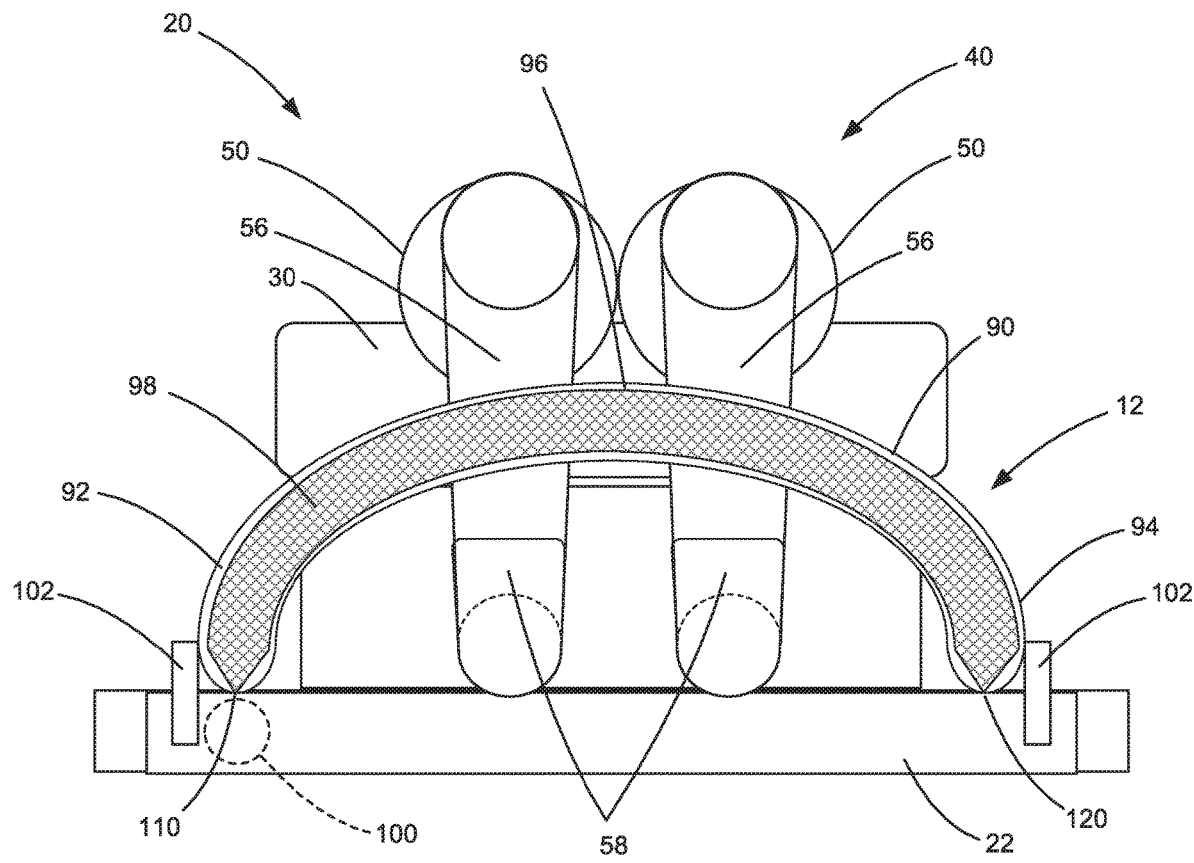
FIG. 6 is a schematic illustration of the vehicle depicting the vehicle safety system in a deployed condition, according to another configuration of the system.

Referring to FIG. 6, the apparatus 12 can be configured to include a reaction structure for supporting the tube 90. As shown in FIG. 6, the reaction structure 98, indicated generally with cross hatching, covers all or a portion of the inflatable tube 90. For example, the reaction structure 98 can be a fabric portion of the inflatable tube 90, either integrally woven with the tube or separately formed and attached to the tube. The reaction structure 98 can be positioned opposite the surface or portion of the tube 90 that receives the lower legs 56 and resists movement of the tube in response to being impacted by the legs. As a result, the inflatable tube 90 becomes compressed between the lower legs 56 and the reaction structure 98, which allows the tube to cushion the legs as it restrains the legs against hyperextension.

The reaction structure 98 can be constructed and configured to achieve this function in a variety of manners. For example, the reaction structure 98 can be a length of fabric, e.g., a strap that is generally inelastic forms the connection points of the apparatus 12 at the opposite ends 92, 94 of the inflatable tube at or near the locations 110, 120. The reaction structure 98 can, for example, be connected to the vehicle by the connectors 102. In this configuration, the inflatable tube 90 can be connected to the reaction structure 98 by means, such as stitching, adhesives, ultrasonic welding, heat bonding, etc.

As another example, the reaction structure 98 can be formed as an integral portion of the inflatable tube 90, e.g., by weaving the reaction structure along with the tube in a one piece woven (OPW) construction of the apparatus 12. In this construction, again, the reaction structure 98 can form the ends 92, 94 that connect the apparatus 12 to the vehicle and extend between those ends. In this manner, tension between the ends 92, 94 is borne by the reaction structure 98. The inflatable portion of the tube 90, being positioned between the reaction structure and the lower legs 56, compresses under the impact forces of the legs and provides a cushioning effect.

Figure 7:
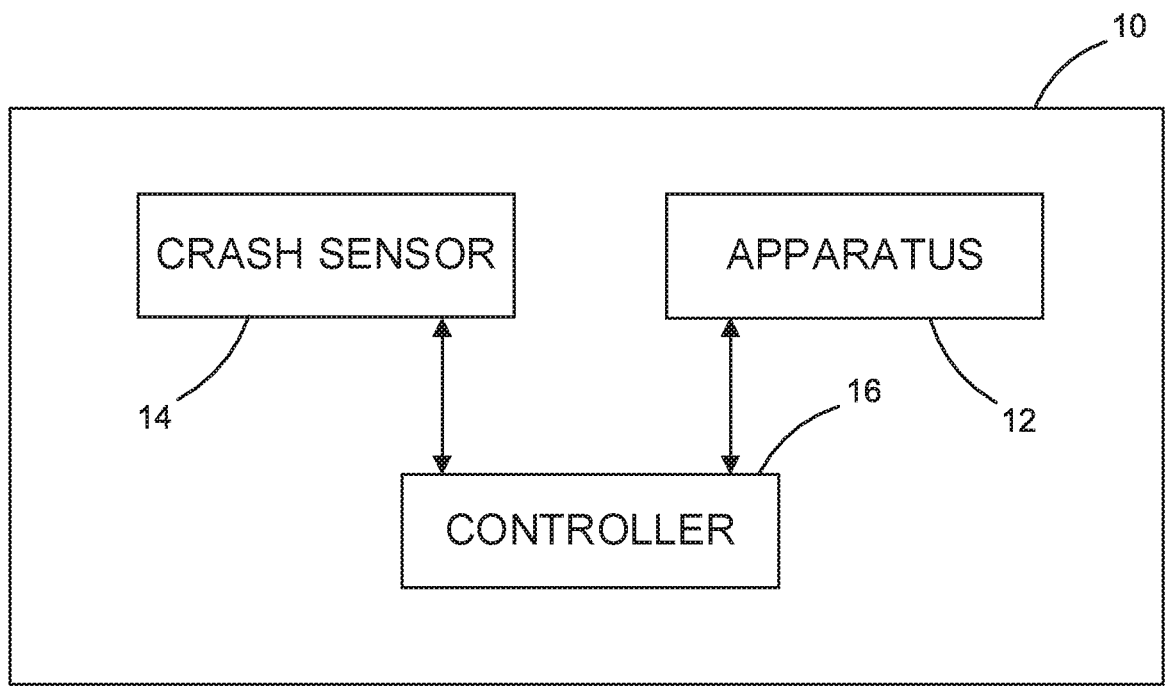
FIG. 7 is a schematic diagram showing an example of a system that can protect occupants of a vehicle in the event of a collision.

Referring to FIG. 7, the apparatus 12 can be implemented in a vehicle safety system 10 for helping to protect occupants 40 of a vehicle 20, especially an autonomous vehicle, in the event of a collision. In addition to the apparatus 12, the system 10 also includes at least one crash sensor 14 for detecting a vehicle collision event and a controller 16 for controlling actuation of the apparatus. The controller 16 receives a signal from the at least one crash sensor 14 in response to the vehicle collision event and actuates the inflator 100 to deploy the inflatable tube 90 in response to receiving the signal.

Figure 8:
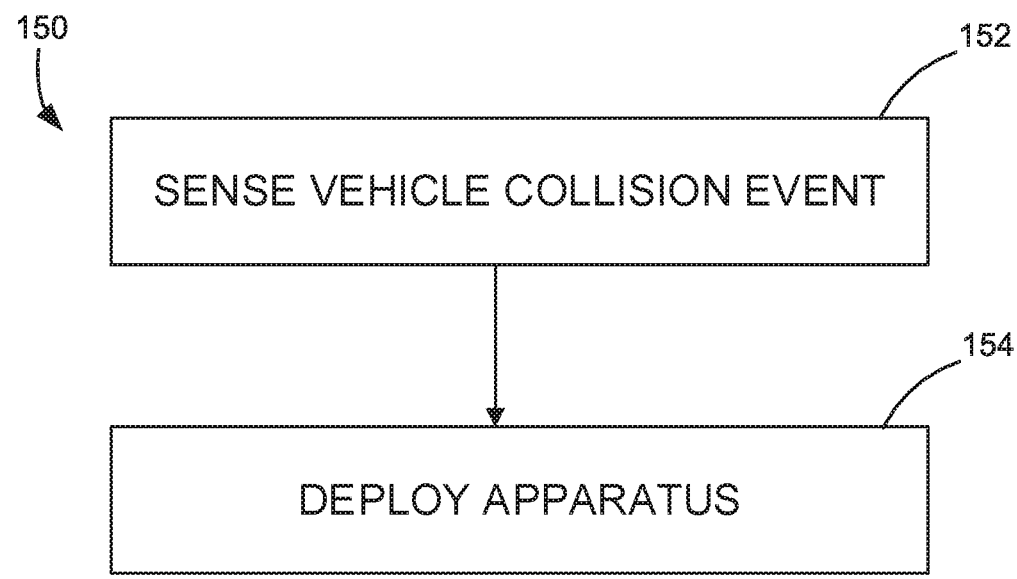
FIG. 8 is a process flow diagram showing methods for helping to protect occupants of a vehicle in the event of a collision.

From the above, it will be appreciated that, in addition to apparatus 12 described herein, the invention also relates to a method for helping to protect an occupant of a vehicle, especially an autonomous vehicle, in the event of a collision. FIG. 8 illustrates the method 150 as a process flow diagram with flow chart illustration. For purpose of simplicity, the method 150 is described as being executed serially; however, it is to be understood and appreciated that the present disclosure is not limited by the illustrated order, as some steps could occur in different orders and/or concurrently with other steps shown and described herein. Additionally, the method 150 can include steps in addition to those illustrated in FIG. 8.

The method 150 can be executed by hardware—for example, the method 150 can be performed primarily by the controller 16 of the system 10 of FIG. 7. One or more hardware elements of the controller 16 of the system 10 can execute software routine to implement at least a portion of the method. Additionally, one or more elements of the controller 16 of the system 10 can include a non-transitory memory (not shown) storing the software routines and one or more processors (not shown) to execute the software routines corresponding to at least the portion of the methods. Other components of the apparatus 13 and the system 10 of FIGS. 1-7 may also be used to facilitate the method.

Referring now to FIG. 8, the method 150 includes sensing the occurrence of a vehicle collision at step 152. This step 152 can be performed, for example, by the controller 16 using signals provided by the at least one crash sensor 14. The method 150 also includes step 154—deploying the apparatus 12, in response to the vehicle collision sensed at step 152, to restrain the lower legs 56 and/or feet 58 of the occupant 40 in the manner described above.

More specifically, step 154 includes deploying the inflatable tube 90 to encircle the occupant's 40 legs on at least three sides and to receive and restrain the lower legs 56 and/or feet 58 of the occupant 40. Step 154 therefore includes the inflatable tube 90 restraining the lower legs 56 and feet 58 of the occupant 40 against forward/upward movement or swinging prior to hyperextending the knees 54. Step 154 additionally includes using the inflatable tube 90 to contact the front of the lower legs 56 (e.g., in the area of the tibia) and restrain the lower legs and feet. Step 154 can include pressurizing the inflatable tube 90 to a degree sufficient to provide some cushioning of the impact while, at the same time, restricting lower leg movement. The pressurization can be configured such that the inflatable tube 90 deforms in response to the lower legs 56 impacting the tube, which can offer some deceleration of the lower legs, as opposed to an abrupt stoppage of lower leg motion.

From the above description, those skilled in the art will perceive improvements, changes and modifications. Such improvements, changes and modifications are within the skill of one in the art and are intended to be covered by the appended claims.

The following is claimed:

1. An apparatus for helping to protect occupants of a vehicle in the event of a collision comprising:
   an inflatable tube having first and second ends and a middle portion that extends from the first to the second end;
   a reaction structure that supports the inflatable tube along its length and has opposite ends connected to a floor of the vehicle, the reaction structure being configured so that the inflatable tube is positioned between the reaction structure and an impacting occupant's lower legs and/or feet; and
   an inflator that is actuatable to direct inflation fluid into the inflatable tube in response to a vehicle collision, wherein the inflatable tube and reaction structure are configured to deploy from the vehicle floor in response to the inflatable tube receiving inflation fluid from the inflator, and wherein the middle portion of the inflatable tube and the reaction structure are configured to extend above the vehicle floor to define a space for receiving the lower legs and/or feet of the occupant and restrain forward motion of the lower legs and/or feet in response to the vehicle collision, wherein the reaction structure is configured to support the inflatable tube against movement in response to the forward motion of the lower legs and/or feet of the occupant.

2. The apparatus of claim 1, wherein the first and second ends of the inflatable tube are connected to the vehicle floor at locations forward of a vehicle seat and at or near the laterally outer bounds of the vehicle seat.

3. The apparatus of claim 2, wherein the locations at which the first and second ends of the inflatable tube are connected to the vehicle are configured to be on outer sides of the occupant's feet when the occupant is seated in the vehicle seat in a normally seated position.

4. The apparatus of claim 1, wherein the inflatable tube when inflated is configured to have an arch shape.

5. The apparatus of claim 1, wherein the inflatable tube is configured to surround the occupant's legs on at least three sides.

6. The apparatus of claim 1, wherein the inflatable tube is configured so that the occupant's legs are restrained prior to hyperextension.

7. The apparatus of claim 1, wherein the inflatable tube is stored in or on the floor of the vehicle in a pre-deployment state.

8. The apparatus of claim 1, wherein the inflatable tube is configured to contact at least one of the tibia or feet of the occupant in a deployed state, wherein the lower legs and/or feet of the occupant are restrained by the inflatable tube applying a restrictive force on the tibia or feet.

9. The apparatus of claim 1, wherein the inflator is configured to pressurize the inflatable tube to a degree sufficient to cushion the impact with the occupant through deformation so as to decelerate the lower legs and/or feet of the occupant.

10. The apparatus of claim 1, wherein the inflatable tube has an inflated diameter between approximately 2 inches and 6 inches.

11. The apparatus of claim 1, wherein the first end and the second end of the inflatable tube are attached to the floor approximately 0.5 meters apart.

12. The apparatus of claim 1, wherein the reaction structure comprises a strap attached to the inflatable tube or a portion of one piece woven structure that includes the tube.

13. The apparatus of claim 1, wherein the first end and the second end of the inflatable tube have a smaller diameter than a diameter of the middle portion of the inflatable tube.

14. A method for helping to protect occupants of a vehicle in the event of a collision comprising the steps of:
sensing an occurrence of a vehicle collision event; and
deploying the apparatus of claim 1 in response to the sensed vehicle collision.

15. A system for helping to protect occupants of a vehicle in the event of a collision comprising:
the apparatus of claim 1;
at least one crash sensor for detecting a vehicle collision event; and
a controller for receiving a signal from the at least one crash sensor in response to the vehicle collision event, wherein the controller is configured to actuate the inflator to deploy the inflatable tube in response to receiving the signal from the crash sensor.

16. The apparatus of claim 1, wherein the reaction structure has an inelastic fabric construction and is configured to bear tension in response to the forward motion of the lower legs and/or feet of the occupant so that the inflatable tube does not bear said tension and is compressed in response to the forward motion of the lower legs and/or feet of the occupant.

* * * * *